US012598181B1

(12) United States Patent
Achappan et al.

(10) Patent No.: US 12,598,181 B1
(45) Date of Patent: Apr. 7, 2026

(54) ADAPTIVE AUTHENTICATION BASED ON REAL-TIME RISK EVALUATION

(71) Applicant: Wells Fargo Bank, N.A., San Francisco, CA (US)

(72) Inventors: Kasiperumal Achappan, Karnatakaq (IN); Ramya Balasubramanian, Telangana (IN); Poornimadevi Pandurangan, Karnataka (IN); Ajay Kumar Panikkar, Sunnyvale, CA (US); Ravi Kanth Thota, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 60 days.

(21) Appl. No.: 18/905,563

(22) Filed: Oct. 3, 2024

(51) Int. Cl.
H04L 9/40 (2022.01)

(52) U.S. Cl.
CPC ................................. H04L 63/0884 (2013.01)

(58) Field of Classification Search
CPC .................................................... H04L 63/0884
See application file for complete search history.

(56) References Cited

U.S. PATENT DOCUMENTS

| | | | | | |
|---|---|---|---|---|---|
| 9,979,744 | B1 * | 5/2018 | Casillas | ................... | G06F 21/31 |
| 2012/0054826 | A1 * | 3/2012 | Asim | ................... | G06F 21/6245 |
| | | | | | 726/1 |
| 2014/0359722 | A1 * | 12/2014 | Schultz | ............... | H04L 63/0861 |
| | | | | | 726/5 |
| 2015/0067831 | A1 * | 3/2015 | Wawda | .................... | G06F 21/57 |
| | | | | | 726/22 |
| 2015/0089568 | A1 * | 3/2015 | Sprague | .................. | H04L 63/06 |
| | | | | | 726/1 |
| 2016/0127900 | A1 * | 5/2016 | John Archibald | ...... | G06F 21/32 |
| | | | | | 726/7 |
| 2016/0224803 | A1 * | 8/2016 | Frank | ................... | G06F 21/6245 |
| 2018/0293387 | A1 * | 10/2018 | Bar-El | ............... | H04L 63/0884 |
| 2019/0132308 | A1 * | 5/2019 | Graham | ............. | H04L 63/0876 |
| 2020/0274902 | A1 * | 8/2020 | Gopal | ................. | H04L 63/0209 |
| 2020/0322169 | A1 * | 10/2020 | Michaud | ............... | H04L 9/3247 |
| 2021/0297455 | A1 * | 9/2021 | Keith, Jr. | ............... | G06F 21/62 |
| 2022/0353276 | A1 * | 11/2022 | Hegrat | ................... | G06N 20/00 |
| 2023/0237134 | A1 * | 7/2023 | Douglas | ................ | G06F 21/316 |
| | | | | | 713/186 |
| 2024/0195819 | A1 * | 6/2024 | Grajek | ................ | H04L 63/1416 |
| 2025/0030739 | A1 * | 1/2025 | O'Neill | ............... | H04L 63/1433 |

* cited by examiner

*Primary Examiner* — Darren B Schwartz
(74) *Attorney, Agent, or Firm* — Merchant & Gould P.C.

(57) ABSTRACT

A computer system and method for managing device trust during digital interactions. The method comprises capturing device data, including static and dynamic parameters, from a device upon user login to a digital platform. Static parameters are analyzed during the initial login to establish a static trust score, while dynamic parameters are analyzed across sessions to establish a dynamic trust score, which is incrementally updated based on subsequent data. The static and dynamic trust scores are combined to generate a combined trust score, and the device is assigned to one of multiple risk clusters. Based on the assigned cluster, adaptive security protocols are triggered. Assignment to a moderate-risk cluster initiates a step-up authentication process, and failure of the process results in assignment to a high-risk cluster, restricting access to the platform.

20 Claims, 4 Drawing Sheets

100

Client
Device 102

Server
Device 104

Network 106

Resource
108

ADAPTIVE AUTHENTICATION BASED ON REAL-TIME RISK EVALUATION

BACKGROUND

As digital interactions increasingly dominate the financial services sector, the complexities associated with verifying the authenticity of devices used in customer transactions have become more pronounced. In particular, device fraud scenarios, such as compromised devices leading to account takeovers, SIM cloning, and the use of compromised credentials, present significant challenges for financial institutions. These fraudulent activities undermine the security of online financial systems, threatening the integrity of customer accounts and sensitive financial data. As a result, there is a growing need for robust methods to assess the trustworthiness of devices interacting with financial platforms.

Conventional approaches to device authentication can be insufficient to address the evolving nature of digital fraud. The challenges lie in rapidly and accurately assessing device trust to prevent fraudulent transactions, while minimizing disruptions to the user experience. Solutions must balance security measures with the need for seamless interaction, ensuring that legitimate users are not hindered by cumbersome security protocols, while effectively identifying and mitigating potential threats in real-time.

SUMMARY

The present concept relates to real-time device risk evaluation that assesses and categorizes the trust level of a device by leveraging both static and dynamic device parameters. In particular, the static parameters, such as device identifiers, secure tags, and hardware characteristics, are analyzed once during an initial login session. Following this, dynamic parameters, including geo-location changes, Internet Protocol (IP) shifts, and unusual activity patterns, are evaluated in real-time during user actions both within the current session and across subsequent sessions. Based on the evaluation of dynamic parameters, the system assigns the device to one of a plurality of risk clusters, such as a trusted cluster, a moderate risk cluster, or a high-risk cluster, each triggering specific security protocols.

In one embodiment, a device assigned to the trusted cluster allows customer requests to be processed without additional authentication. If assigned to the moderate risk cluster, the system prompts a step-up authentication process, and upon successful verification, the device is reclassified to the trusted cluster. If authentication fails, the device trust is gradually degraded, moving the device to the high-risk cluster. Devices in the high-risk cluster are subject to temporary restrictions until the risk is mitigated, after which the customer may contact a customer service representative or banker to reset the device trust profile and resume normal operations. The concept can further employ machine learning algorithms to refine the accuracy of risk assessments by learning from user interactions and adapting to emerging threats.

The details of one or more techniques are set forth in the accompanying drawings and the description below. Other features, objects, and advantages of these techniques will be apparent from the description, drawings, and claims.

DETAILED DESCRIPTION

Figure 1:
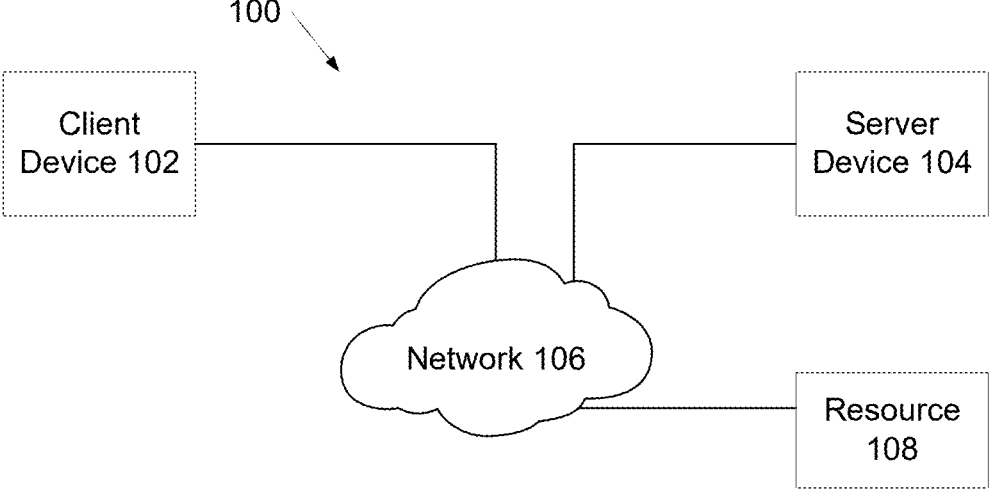
FIG. 1 shows an example of a computer system for managing device trust during digital interactions.

This disclosure relates to managing device trust during digital interactions.

The concept comprises a computing environment with one or more client devices connected to a server device via a network. The server device, which may include a single server or a collection of servers, is equipped with computing resources, including processors and data storage repositories, allowing client devices to engage in tasks involving the receipt and processing of data from various sources to manage device trust during digital interactions. The concept involves executing instructions stored on non-transitory computer-readable media to facilitate the evaluation of both static and dynamic device parameters for trust management.

In one embodiment, upon a user's login to a digital platform, the concept captures device data, including static parameter data, such as device identifiers, secure tags, hardware characteristics, operating system details, device manufacturer information, and authentication credentials. The static parameters are analyzed during the initial login session to establish a static trust score component for the device. Concurrently, the concept captures and evaluates dynamic parameter data, which may include geo-location changes, IP address shifts, session length, login frequency, transaction patterns, and usage anomalies. These dynamic parameters are analyzed both during the initial session and across future sessions, allowing the concept to incrementally update the dynamic trust score component of the device based on subsequent interactions.

The static trust score component and the dynamic trust score component are combined to form a comprehensive, combined trust score, which is used to assign the device to one of several risk clusters. The concept categorizes devices into a first risk cluster (trusted), a second risk cluster (moderate risk), or a third risk cluster (high risk) based on the combined trust score. Depending on the assigned cluster, the concept triggers adaptive security protocols. For example, a device in the first risk cluster may proceed with minimal security checks, while a device in the second risk cluster may initiate a moderate risk level authentication process, requiring additional verification such as a one-time passcode, biometric authentication, or security questions. If this authentication process fails, the device is assigned to the third risk cluster, resulting in restricted access to the digital platform until further verification is completed.

The concept further enables the combined trust score to be updated after each subsequent analysis of dynamic parameters, ensuring real-time adjustments to the device's trust status. In some embodiments, the concept includes the use of an artificial intelligence model to predict future dynamic parameter data based on historical patterns, thereby enhancing the ability to detect and mitigate potential risks arising from anomalous device behavior.

The concept also incorporates dynamic unlearning of previous device risk statuses once a device's trust profile has been successfully reset following authentication or risk mitigation. This ensures that the concept maintains an accurate and up-to-date trust profile for each device, reducing the likelihood of unnecessary security checks for previously high-risk devices that have been reclassified to lower-risk categories. In cases where a device remains in the third risk cluster, the concept may trigger a manual verification process, requiring intervention by a customer contact center or an authorized individual to approve the reset of the device's trust status.

The present concept is rooted in computer technology and addresses technical challenges in online financial services, particularly in online banking and digital transactions within financial systems. The concept tackles the technical problem of device authentication and fraud prevention by leveraging both static and dynamic device parameters, analyzed in real-time, to dynamically assess device trustworthiness. The concept's real-time analysis ensures adaptability to emerging threats and prevents reliance on outdated data, offering a technical solution for secure and seamless user interactions in the financial domain.

The concept incorporates machine learning models to predict device behavior based on historical data, improving the accuracy and efficiency of fraud detection. This predictive capability allows financial institutions to proactively identify anomalous activities, enhancing security while maintaining a smooth user experience for legitimate users. The integration of artificial intelligence in the concept provides a technological improvement over traditional, rule-based systems, which are less responsive to evolving threats.

The concept dynamically triggers adaptive security protocols based on real-time risk assessments, minimizing redundant authentication processes for trusted devices. This approach ensures that security measures are applied as needed, providing strong protection while maintaining user convenience. Additionally, the concept manages device trust effectively across multiple sessions and devices by incrementally updating risk profiles, ensuring a consistent and accurate assessment of security risks.

FIG. 1 illustrates a schematic of a computer system 100 designed for managing device trust during digital interactions. As depicted in FIG. 1, the computer system 100 encompasses a computing environment comprising one or more client devices 102 connected to a server device 104 via a network 106. The one or more client devices 102 are computing devices equipped with processors and memory, capable of initiating various tasks related to capturing and analyzing device data to manage device trust. These client devices 102 may include desktop computers, laptops, mobile devices, or other hardware configured to interface with the components of the network 106. Although only one client device is depicted in FIG. 1, the computer system 100 may include hundreds or thousands of client devices, such as many customers logging into a digital platform (e.g., a financial or banking interface) hosted by the server device 104.

The server device 104, which may be a single server or a collection of servers within a server cluster, possesses computing resources including processors and data storage repositories. These resources enable the one or more client devices 102 to engage in complex tasks involving the receipt, analysis, and processing of both static and dynamic device data to determine a device's trustworthiness. The server device 104 performs the analysis necessary to assign a device to a risk cluster and to trigger appropriate security protocols based on the results of this analysis.

Although depicted as separate devices, the one or more client devices 102 and the server device 104 may share computing resources such as processors and data storage, allowing for a more integrated approach to the evaluation and management of device trust. In certain embodiments, the server device 104 may also integrate resources from third-party vendors or external data sources, depicted as resource 108. These resources 108 may include machine learning algorithms, external databases, or additional processing capabilities that enhance the functionality of the modules described herein, particularly in assessing dynamic device behaviors and detecting potential security threats.

The network 106 serves as the communication backbone, facilitating the exchange of data and interactions between the one or more client devices 102 and the server device 104. The network 106 also ensures the secure and reliable transmission of data, enabling real-time analysis of device trustworthiness. In certain embodiments, the network 106 supports real-time updates to the combined trust score based on dynamic parameter data received from resource 108, ensuring that security protocols are applied in response to the most current threat indicators and device behaviors.

Although many of the examples provided herein refer to digital interactions with financial or banking platforms, the concept as described is equally applicable to other types of digital platforms. For example, the system 100 can be adapted to manage device trust across various platforms, such as social media, retail, and service platforms, by analyzing user behavior, device data, and location patterns to identify security risks and prevent unauthorized access or fraudulent activity. In each case, the system applies the same core principles of evaluating static and dynamic device data to assign risk clusters and trigger adaptive security protocols, ensuring trusted device interactions regardless of the platform type.

Figure 2:
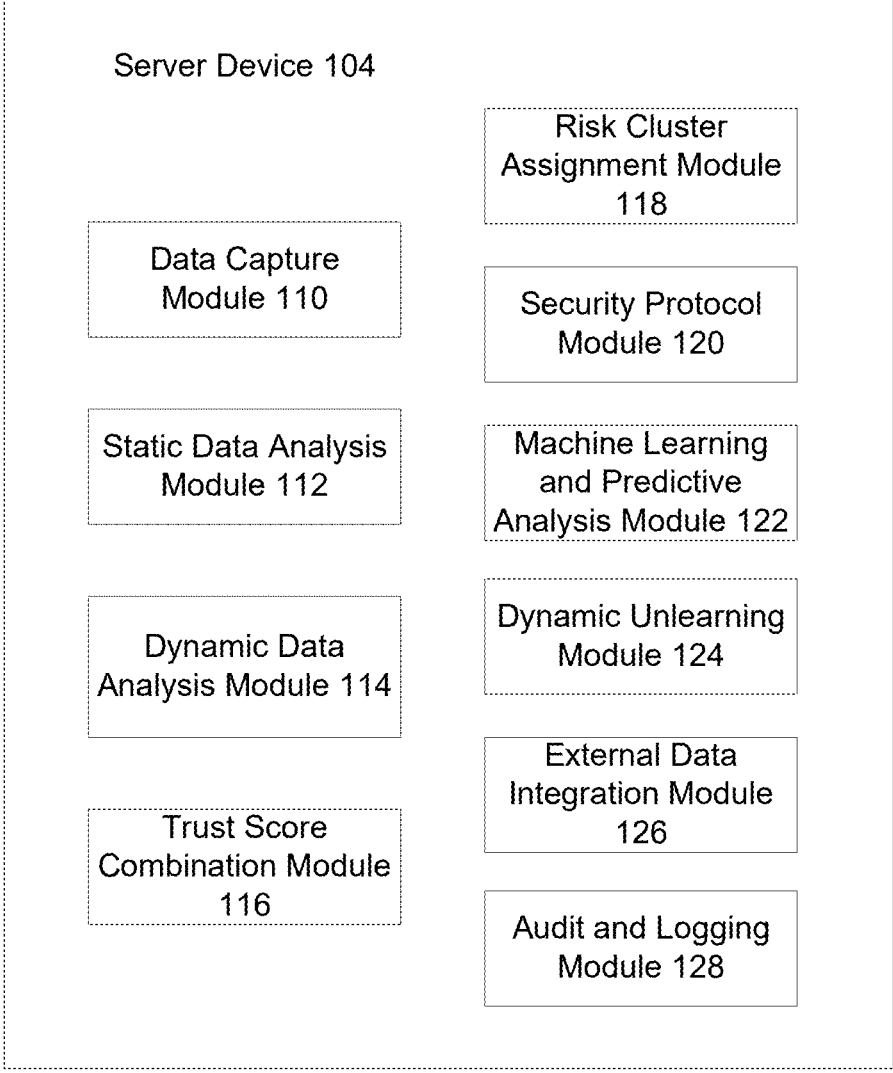
FIG. 2 shows an example server device of the computer system of FIG. 1.

As shown in FIG. 2, the server device 104 can comprise one or more modules, with each module configured as a specialized component adapted to perform specific computational processing tasks within the computer system 100. In certain embodiments, the server device 104 can incorporate the following modules: data capture module 110, static data analysis module 112, dynamic data analysis module 114, trust score combination module 116, risk cluster assignment module 118, security protocol module 120, machine learning and predictive analysis module 122, dynamic unlearning module 124, external data integration module 126, and audit and logging module 128. Together, these modules form an integrated sub-system within the server device 104, facilitating real-time management of device trust during digital interactions. Each module is configured to perform specific aspects of device data analysis, trust scoring, risk assessment, and security protocol initiation, ensuring that devices interacting with the digital platform are continuously evaluated for trustworthiness while maintaining seamless and secure user experiences.

The data capture module 110 is configured to capture and record device-specific data from one or more client devices 102 during a user's interaction with a digital platform, such as a financial institution's online banking system. The data capture module 110 operates to obtain both static and dynamic parameters from the client device 102 upon initiation of a session, such as during login or any subsequent user interaction. The captured data is transmitted and stored in the server device 104 for further processing and analysis by other system components, such as the static data analysis module 112 and dynamic data analysis module 114.

Static data refers to device-specific information that generally remains consistent across multiple interactions and is not expected to change frequently. This type of data provides foundational information about the device and its configuration at the time of login or interaction. Static data captured by the data capture module 110 may include a unique device identifier, such as a MAC address, International Mobile Equipment Identity (IMEI), or device fingerprint, as well as secure tags like cookies, device tokens, or secure session keys stored on the client device for identification and authentication purposes across sessions.

Additionally, static data may include hardware characteristics such as the make, model, and manufacturer of the client device, along with other hardware-related details like the processor type, memory capacity, display resolution, and operating system details such as the version and type of the operating system running on the client device (e.g., iOS, Android, Windows) and the build number of the installed software. Further static device parameters may include the device ID, OEM (Original Equipment Manufacturer) details, model and operating system version, secure tags or device cookies, and user-specific information such as Customer ID, Session ID, username, app version, and the authentication method used (e.g., biometric authentication, password entry).

For example, when a customer logs into their online financial account using a mobile phone, the data capture module 110 records the device's IMEI, the version of the iOS or Android operating system, and any secure tokens saved from previous login sessions. This static data remains relatively stable across multiple sessions and is integral to the overall trust evaluation process for the device, ensuring that known devices can be trusted with minimal security friction.

Dynamic data, on the other hand, refers to data that is subject to change over time or across sessions, providing real-time insight into the context of the device's current activity. This type of data is continuously evaluated throughout the session and includes behavioral and environmental factors that may indicate anomalies or potential security risks. Dynamic data captured by the data capture module 110 may include the current geographic location of the client device, determined using GPS or IP address geolocation services, allowing the system to detect whether the user is logging in from an expected or unusual location.

Additionally, dynamic data includes the current IP address of the client device and any changes in the IP address during the session, as frequent IP address changes may suggest the use of a proxy or VPN, which could indicate a security risk. Other dynamic device parameters may include geo-location changes, IP address shifts, login time and frequency patterns, and session length, which refer to the duration of the user's interaction with the digital platform and provide context about whether the session behavior aligns with typical usage patterns.

The system may also capture primary and secondary authentication status, which involves the type and success of authentication methods such as password-based login or biometric verification. Additionally, transaction amounts and patterns, particularly if significantly different from historical transactions, can also indicate anomalous behavior. Further dynamic data includes login frequency, referring to the number of login attempts or successful logins over a certain period, and behavioral usage patterns, such as the sequence and timing of actions taken by the user (e.g., navigation through the interface, time spent on specific tasks), which can be analyzed to detect potential anomalies or deviations from typical user behavior.

For example, if a customer logs into their financial account from a new geographic location or using an unfamiliar IP address, the data capture module 110 would record this dynamic data. The system could then assess whether the behavior is consistent with the customer's usual activity or if it deviates from expected patterns, such as a sudden shift in geo-location or IP address that may indicate potential fraud.

The data capture module 110 collects and stores both static and dynamic data in the server device 104's data storage repositories. This data is subsequently analyzed to generate a trust score for the device, allowing the system to determine whether additional security protocols, such as multi-factor authentication or access restrictions, are necessary to safeguard the integrity of the user's financial account.

The static data analysis module 112 is configured to analyze the static parameter data captured from a client device 102 during an initial login session. The purpose of the static data analysis module 112 is to process the static parameters—such as device identifiers, secure tags, hardware characteristics, and operating system details-associated with the client device 102 in order to establish a static trust score component for the device. This static trust score provides an assessment of the trustworthiness of the device based on unchanging or infrequently changing parameters, which can be compared against previously known values for consistency. The static trust score component is used in determining whether the client device 102 should be trusted in the context of the current login session.

During the analysis, the static data analysis module 112 compares the current static parameters of the device with historical records stored in the server device 104. If the static parameters match previously recorded data associated with the user's account and device, the static trust score will reflect a high level of trust. For example, if a user logs into an online financial account with a familiar client device 102, such as their personal laptop or mobile phone, and the static data analysis module 112 determines that the device identifier, hardware characteristics, and secure tags have not changed since the last login session, the static trust score will indicate a high level of trust for the device. In this case, the system may allow the user to proceed with minimal security checks, as the static data analysis module 112 has confirmed the device's authenticity.

In contrast, when a user logs in using a previously unused or new client device 102, such as a newly purchased smartphone or a computer that has never been used to access the account, the static data analysis module 112 may detect that the static parameter data does not match any existing records. In such cases, the module may prompt the system to request additional static parameter data to verify the trustworthiness of the new device. For instance, the static data analysis module 112 may flag the new device as unknown and request further verification, such as the user entering a one-time passcode sent to a trusted device or answering security questions. Only after receiving and verifying this additional static data will the static data analysis module 112 establish trust with the new device, potentially assigning a lower static trust score due to the absence of historical data but permitting the user to proceed after successful verification.

In both examples, the static data analysis module 112 evaluates the consistency of the device's static parameters and determines the initial level of trust assigned to the client device 102, thereby contributing to the overall trust score used to manage device security during digital interactions.

The dynamic data analysis module 114 is configured to analyze dynamic parameter data captured from a client device 102 during an initial login session and across subsequent sessions. The purpose of the dynamic data analysis module 114 is to evaluate dynamic parameters—such as geo-location, IP address shifts, session length, login frequency, and behavioral patterns—in order to establish a dynamic trust score component for the device. Unlike static parameters, dynamic parameters are subject to change during and across sessions, and the dynamic trust score component reflects the trustworthiness of the device based on these real-time factors. The dynamic trust score component is incrementally updated as new dynamic data is captured during subsequent interactions, allowing the system to continually assess the security of the device in real-time.

During the analysis, the dynamic data analysis module 114 evaluates the current session's dynamic parameters against historical data to determine whether any deviations or anomalies are present. For instance, if a user logs into an online financial account using a familiar client device 102, and the dynamic data analysis module 114 determines that the geo-location, IP address, and usage patterns match the user's previous logins, the dynamic trust score will indicate a high level of trust. In this scenario, the system may determine that the user is logging in from their usual geographic location, using the same network and exhibiting normal behavioral patterns, and therefore the dynamic data analysis module 114 may assign a high dynamic trust score. This high trust score allows the user to proceed with minimal additional security measures.

In contrast, when a user logs in with the same client device 102, but the dynamic data analysis module 114 detects an unexpected IP shift, this may indicate a potential security concern. For example, the user may typically log in from a specific IP address or range of addresses corresponding to their home or office, but during this session, the dynamic data analysis module 114 may detect that the IP address has changed unexpectedly or is located in a different geographic region. This IP shift could suggest that the user is logging in from an unknown location, potentially using a proxy or VPN, which could be an indicator of fraudulent activity. In response, the dynamic trust score would be changed, reflecting a decreased level of trust in the device. As a result, the system may trigger additional security protocols, such as requiring multi-factor authentication or limiting the user's access to certain functions until further verification is completed.

In both examples, the dynamic data analysis module 114 continuously monitors and evaluates dynamic parameter data throughout the session, updating the dynamic trust score component as necessary to ensure that any deviations from normal patterns are identified and addressed promptly. This incremental updating of the dynamic trust score ensures that the system adapts in real-time to potential threats while maintaining flexibility to accommodate legitimate changes in user behavior.

The trust score combination module 116 is configured to combine the static trust score component and the dynamic trust score component to establish a combined trust score for the client device 102. The purpose of the trust score combination module 116 is to integrate the assessments derived from both static and dynamic analyses, resulting in a comprehensive evaluation of the device's trustworthiness. This combined trust score serves as the basis for assigning the device to an appropriate risk cluster and determining the necessary security protocols.

The static trust score component can be a multidimensional score, wherein each dimension represents a response to a specific security criterion evaluated by the static data analysis module 112. For example, one dimension may assess whether the client device 102 possesses a recognized unique device identifier; another dimension may determine if the device contains valid secure tags or cookies consistent with prior sessions; a further dimension may evaluate the consistency of hardware characteristics, such as processor type and device model, with previously recorded data; and yet another dimension may examine the operating system details to detect any unexpected changes or anomalies. Each dimension provides a quantifiable measure of the device's compliance with expected static parameters, allowing for a granular assessment of the device's static trustworthiness.

Similarly, the dynamic trust score component is also a multidimensional score, with each dimension representing a response to a specific security question evaluated by the dynamic data analysis module 114. For instance, one dimension may evaluate whether the client device 102 is associated with a known or previously recognized IP address; another dimension may assess if there has been a significant shift in the geographic location of the device compared to prior sessions; additional dimensions may analyze factors such as unusual session lengths, atypical login frequencies, unexpected transaction patterns, or deviations in behavioral usage patterns compared to the user's historical data. Each dimension captures a particular aspect of the device's current operational context, contributing to an overall dynamic trust assessment.

The trust score combination module 116 integrates the multidimensional static and dynamic trust scores to establish the combined trust score. This integration may involve applying weighting factors to different dimensions based on their relative importance or using algorithms that synthesize the scores into a unified metric. For example, certain static dimensions like the presence of a recognized device identifier may be weighted more heavily due to their significance in confirming device identity, while dynamic dimensions indicating unusual activity, such as a sudden geo-location change, may also receive higher weights due to their potential to signal fraudulent behavior. The module may employ mathematical models, statistical methods, or machine learning algorithms to accurately combine these multidimensional scores.

By combining the static and dynamic trust scores, the trust score combination module 116 produces a comprehensive trust score that reflects both the inherent characteristics of the device and its current behavioral context. This combined trust score enables the system to make informed decisions regarding the risk level associated with the device, facilitating the assignment to an appropriate risk cluster. The comprehensive nature of the combined trust score allows for nuanced evaluations, ensuring that devices are neither unjustly penalized for minor anomalies nor inadequately scrutinized when multiple risk factors are present.

The risk cluster assignment module 118 is configured to assign the client device 102 to one of several risk clusters based on the multidimensional combined trust score generated by the trust score combination module 116. The purpose of the risk cluster assignment module 118 is to classify the device into a specific risk category that reflects its overall trustworthiness, thereby determining the appropriate security protocols for the current session. The module evaluates the combined trust score, which includes both static and dynamic trust components, and maps this score to a predefined risk cluster.

In one embodiment, the risk cluster assignment module 118 classifies the client device 102 into one of three risk clusters: the first risk cluster corresponds to a trusted status, the second risk cluster corresponds to a moderate risk status, and the third risk cluster corresponds to a high-risk status. Devices assigned to the first risk cluster are considered trustworthy and may proceed with minimal or no additional security checks. Devices placed in the second risk cluster may trigger moderate security measures, such as step-up authentication, while devices classified in the third risk cluster may face access restrictions or heightened security protocols due to the higher risk level.

In alternative embodiments, the risk cluster assignment module 118 may assign devices to a larger number of risk clusters, allowing for finer distinctions in trust levels. These additional clusters provide more granularity, enabling more tailored security responses based on the specific trust evaluation.

To classify the multidimensional combined trust score into a risk cluster, the risk cluster assignment module 118 may employ mathematical algorithms, such as a nearest neighbor function. Each dimension of the combined trust score represents a response to specific security criteria, both static and dynamic. For example, one dimension may assess whether the device has a recognized unique identifier, while another dimension may evaluate if the device is logging in from a familiar IP address or geographic location. These dimensions form a multidimensional trust score vector in a mathematical space, where each risk cluster is represented by a centroid or predefined boundary.

The nearest neighbor algorithm operates by comparing the multidimensional combined trust score to the centroids or boundaries of the risk clusters. The module calculates the distance between the combined trust score vector and the centroids representing the different risk clusters in the multidimensional space. The device is assigned to the risk cluster whose centroid or boundary is closest to the trust score vector. In this way, the risk cluster assignment module 118 ensures that each dimension of the combined trust score-whether it pertains to static data (e.g., device identifier consistency) or dynamic data (e.g., IP address shifts)—is factored into the final risk classification.

In other embodiments, the risk cluster assignment module 118 may utilize additional clustering algorithms, such as k-means clustering or hierarchical clustering, to classify the combined trust score. These algorithms similarly account for each dimension of the trust score to determine the device's overall risk level.

By employing mathematical algorithms to classify the multidimensional combined trust score, the risk cluster assignment module 118 provides a precise and efficient method of categorizing devices based on a holistic trust assessment. This ensures that the appropriate level of security is applied, reflecting the specific risks identified in both static and dynamic dimensions of the trust score.

The security protocol module 120 is configured to trigger adaptive security protocols based on the risk cluster assigned to the client device 102 by the risk cluster assignment module 118. The purpose of the security protocol module 120 is to ensure that the appropriate level of security measures is dynamically applied in response to the risk level associated with the device, as determined by its combined trust score. By tailoring the security protocols to the assigned risk cluster, the system balances user convenience with the need to prevent unauthorized access and mitigate potential fraud.

In one embodiment, when the client device 102 is assigned to the first risk cluster, which corresponds to a trusted status, the security protocol module 120 initiates minimal or no additional security checks. For instance, if the combined trust score, including both static and dynamic components, indicates that the device is highly trustworthy—e.g., the device's unique identifier is recognized, the IP address is familiar, and no unusual login behavior is detected—the security protocol module 120 may allow the user to access the digital platform without requiring further authentication. In this example, the user may seamlessly log into their online financial account, with the system relying on the high level of trust established by the combined trust score, thus optimizing the user experience without compromising security.

In another embodiment, where the client device 102 is assigned to the second risk cluster, corresponding to a moderate risk status, the security protocol module 120 triggers additional security measures, such as step-up authentication. For example, if the device's combined trust score reveals slight deviations from typical behavior—e.g., the device is logging in from a new but plausible geographic location, or the IP address has shifted slightly—the security protocol module 120 may require the user to complete a step-up authentication process. This may involve sending a one-time passcode to the user's registered phone number or email, requesting biometric authentication, or posing security questions. If the user successfully completes the step-up authentication process, the system may reassign the device to the first risk cluster and allow full access to the platform. However, if the user fails to pass the step-up authentication, the device's trust score may be further reduced, leading to reassignment to the third risk cluster.

In yet another embodiment, where the client device 102 is assigned to the third risk cluster, indicating a high-risk status, the security protocol module 120 enforces stricter security measures. For example, if the combined trust score identifies significant anomalies—such as the device logging in from an unfamiliar geographic location, repeated failed login attempts, or suspicious changes in usage patterns—the security protocol module 120 may restrict access to the digital platform. The user may be prevented from performing certain sensitive actions, such as transferring funds or changing account settings, until further verification steps are completed. In some instances, the module may lock the user's account temporarily, requiring the user to contact customer support or complete manual verification before regaining access.

In certain cases, high-risk users can be directed to call the call center or a banker for a device profile reset. After the reset is successfully completed, the system can reassign the device to the trusted cluster, allowing the user to resume normal activities. In this scenario, the system prioritizes security, applying stringent measures to mitigate the risk of fraud or unauthorized access while providing a clear path for the user to regain trusted status through manual intervention and verification.

Through these examples, the security protocol module 120 dynamically adjusts the security measures based on the assigned risk cluster, ensuring that each device is treated in accordance with its level of trustworthiness. This adaptive approach enables the system to respond to potential security threats in real-time while minimizing unnecessary disruptions for trusted users.

The machine learning and predictive analysis module 122 is configured to predict future dynamic parameter data for the client device 102 based on historical device data. The purpose of this module is to identify patterns in the dynamic data—such as geographic location, IP address changes, session length, and user behavior—by leveraging historical data collected from previous sessions. By applying machine learning algorithms, the module can anticipate expected variations in dynamic parameters and detect deviations that may indicate potential fraud or anomalous activity. The machine learning and predictive analysis module 122 plays a key role in refining the dynamic trust score and enhancing the accuracy of risk assessments for each session.

In one embodiment, the machine learning and predictive analysis module 122 may predict changes in geographic location based on the user's historical login behavior. For instance, if a user regularly logs into their account from home or work, the module may recognize a predictable pattern of logins from these locations. The module could further predict a safe area of expected geographic activity, such as locations within proximity to the user's home or workplace. If the user logs in from a location within this familiar geographic area, the machine learning and predictive analysis module 122 may increase the dynamic trust score, reflecting a higher level of trust. However, if the login originates from a location outside of this predictable range, the module may adjust the dynamic trust score, prompting additional security measures.

In another example, the machine learning and predictive analysis module 122 detects an anomaly where the same user appears to be logged into the digital platform from two different devices in geographically distant locations. For instance, if the user logs into their financial account from a device in New York and, within minutes, a second login is detected from a device in Los Angeles, the module recognizes that it would be impossible for the user to travel such a distance in that time frame. Based on historical patterns of single-device usage, the module would adjust the dynamic trust score and trigger security protocols, such as requiring multi-factor authentication or restricting account access until the anomaly is resolved.

Another example involves the machine learning and predictive analysis module 122 identifying an inconsistency in IP address usage. If a user logs into the digital platform from a known IP address, makes a transaction, and shortly thereafter logs in from a completely different IP address that is geographically distant, the module may detect this as a potential threat. Based on the historical data for the user, the module knows that such a rapid change in IP address is unlikely to occur under normal circumstances. As a result, the dynamic trust score would be adjusted downward, and the system may enforce additional security measures to ensure the legitimacy of the transaction.

In a further example, the machine learning and predictive analysis module 122 can analyze session length. If historical data shows that the user typically takes at least five minutes to complete a transaction (with some minor variations), the module would expect future transactions to follow a similar pattern. Should the user suddenly complete a similar transaction in an unusually short period of time, the module may flag this behavior as suspicious. For instance, if a transaction that typically takes five minutes is completed in under one minute, the module would adjust the dynamic trust score, as this deviation from the predicted session length could indicate an automated script or malicious behavior. The system may then prompt the user to undergo additional verification steps or temporarily limit certain account functions until the unusual behavior is addressed.

The machine learning and predictive analysis module 122 can be arranged to perform a series of logical processes involving the receipt of input data, the application of machine learning algorithms, and the generation of predictive outputs that can inform the system's trust score and risk assessments. The module may operate in conjunction with other components of the system, such as the dynamic data analysis module 114, to potentially enhance the overall accuracy and efficiency of device trust evaluation.

The input to the machine learning and predictive analysis module 122 may include historical device data, which can encompass dynamic parameters such as geo-location changes, IP address shifts, session length, login frequency, and behavioral usage patterns. This data could be captured during prior login sessions and interactions with the client device 102 and stored in the server device 104. The input may also include real-time dynamic data captured during the current session, allowing the module to compare current behavior against the user's historical activity patterns.

Upon receiving the input, the machine learning and predictive analysis module 122 can apply a series of logical processes, including data pre-processing, feature extraction, model training, and prediction. During the data pre-processing stage, the module may clean and organize the input data, removing any inconsistencies, outliers, or noise that could affect the accuracy of the machine learning model. In the feature extraction stage, relevant attributes of the data—such as geographic patterns, login frequencies, or session behavior—may be identified and transformed into a structured format suitable for machine learning algorithms.

The machine learning model itself may be trained using supervised, unsupervised, or reinforcement learning techniques, depending on the specific implementation. In supervised learning, historical data could be labeled with expected outcomes (e.g., normal vs. anomalous behavior), and the model may be trained to predict these outcomes based on new inputs. In unsupervised learning, the model might identify patterns and clusters within the data without predefined labels, potentially allowing it to detect outliers or unusual patterns in real-time. Reinforcement learning may also be employed, where the model learns to make predictions by receiving feedback from its previous decisions, continuously improving over time.

Once trained, the machine learning and predictive analysis module 122 can generate an output consisting of predicted future dynamic parameters for the client device 102. This output may be compared against the current session's dynamic data to detect deviations or anomalies. For instance, if the module predicts that the device should log in from a specific geographic region or IP address based on historical data, but the current session indicates an unexpected location or IP shift, the module might flag this as a potential risk. The module can then produce a risk assessment that may inform the dynamic trust score for the device, which can be used by the risk cluster assignment module 118 and security protocol module 120 to determine the appropriate security measures.

The machine learning and predictive analysis module 122 may be trained to produce reliable outputs through a process of iterative learning. Initially, the model may be trained on a dataset of historical device behavior, including both normal activity and known anomalies. The training process can involve adjusting the model's parameters to minimize prediction errors. The module's performance may be evaluated using test data to assess its accuracy and generalization to new, unseen inputs. As more data is collected during subsequent user interactions, the model can continue to learn and refine its predictions, potentially improving its reliability over time.

The dynamic unlearning module 124 is configured to adjust or reset the risk assessment of a client device 102 by dynamically unlearning previously assigned risk statuses after the device's trustworthiness has been re-established. The purpose of the dynamic unlearning module 124 is to ensure that the system does not rely solely on historical data that may no longer reflect the current state of the device, thereby allowing the device to regain a trusted status once any previous risks have been mitigated or resolved.

The dynamic unlearning module 124 may operate by modifying or removing elements of the device's historical data, particularly when that data contributed to a lower trust score or risk classification. For example, if a device was previously assigned to a higher risk cluster due to anomalies such as an unfamiliar IP address or unexpected geo-location changes, the dynamic unlearning module 124 can be configured to reset the associated risk status once subsequent sessions demonstrate normal, consistent behavior. This resetting process can involve adjusting the device's dynamic trust score component, thereby allowing the device to return to a more favorable trust classification.

The dynamic unlearning module 124 can be triggered by certain conditions, such as successful authentication following a security protocol or the resolution of previously detected anomalies. Upon verification of the device's legitimacy—e.g., through multi-factor authentication or manual intervention—the dynamic unlearning module 124 may gradually or immediately reduce the weight of historical risk factors in determining the device's trust score. This process ensures that a device is not continuously penalized for isolated security incidents and can progressively return to a trusted status, enabling more seamless future interactions with the digital platform.

In some embodiments, the dynamic unlearning module 124 may operate in conjunction with machine learning models, which may allow the system to "forget" certain risk patterns while retaining those that are more predictive of future security threats. By doing so, the system can refine its overall trust assessment for the device, ensuring that only relevant and current data are factored into future risk evaluations. The dynamic unlearning process contributes to the flexibility of the system, allowing for adaptive security protocols that respond to both past behavior and newly demonstrated trustworthiness.

The external data integration module 126 is configured to facilitate the incorporation of data from external sources into the system's overall trust and security evaluation processes. The purpose of the external data integration module 126 is to enhance the system's ability to assess device trustworthiness by integrating additional data points or third-party information that may not be natively available within the system. This module can broaden the scope of data used for trust evaluation by incorporating external inputs such as threat intelligence feeds, external databases, machine learning services, or other third-party security resources.

The external data integration module 126 can be designed to retrieve, process, and format external data for compatibility with the system's internal risk assessment processes. For example, the module may connect to external databases containing device reputation scores, IP address blacklists, geo-location verification services, or known threat vectors. Upon retrieving such data, the external data integration module 126 may format or preprocess the data before passing it to other system modules, such as the dynamic data analysis module 114 or the machine learning and predictive analysis module 122, for incorporation into the overall trust evaluation.

In some embodiments, the external data integration module 126 may interface with third-party machine learning models or cloud-based security services to obtain enhanced threat detection or behavioral analysis capabilities. For example, if an external service provides real-time threat intelligence regarding malicious IP addresses or compromised devices, the external data integration module 126 may continuously update the system with this information, ensuring that the risk evaluations for client devices 102 are based on the most up-to-date external intelligence.

The external data integration module 126 may operate by utilizing APIs, web services, or other network communication protocols to facilitate data exchange between the system and external sources. In certain embodiments, the module may perform periodic data synchronization, allowing external data sources to be regularly queried for updates relevant to the device's trust score. Alternatively, the module may process real-time streams of external data, allowing the system to adapt to new security threats as they emerge.

The incorporation of external data through the external data integration module 126 can enhance the system's flexibility and responsiveness to evolving threats. By leveraging third-party information and external security resources, the system can improve the accuracy of its trust assessments and ensure that decisions regarding device trustworthiness are informed by a broader range of data. This enables the system to apply more effective security protocols based on a comprehensive and up-to-date view of potential risks.

The audit and logging module 128 is configured to record and maintain a detailed log of all system activities related to device trust evaluation and security protocol execution. The purpose of the audit and logging module 128 is to create an auditable trail of events that can be used for compliance, forensic analysis, troubleshooting, and system monitoring. This module ensures that all relevant data processing, risk assessments, and security actions performed by the system are systematically documented for future reference.

The audit and logging module 128 may capture various types of events, including but not limited to, the capture of static and dynamic device data, the trust score calculations performed by the static data analysis module 112 and the dynamic data analysis module 114, the assignment of devices to risk clusters by the risk cluster assignment module 118, and the triggering of security protocols by the security protocol module 120. Each logged event may include information such as the time and date of the event, the specific actions taken, the device involved, and any changes in the device's trust score or risk classification.

In addition to logging system actions, the audit and logging module 128 may also record user interactions and system responses to those interactions, such as successful or failed authentication attempts, security challenges presented to the user, and responses to security protocols. This data can be used to analyze user behavior, detect patterns of fraudulent activity, or provide evidence in the event of security incidents.

The audit and logging module 128 may also store logs in a secure and tamper-resistant manner, ensuring that all records are preserved for an extended period in compliance with regulatory requirements or organizational policies. The module may include features that allow authorized users to access, search, and retrieve specific logs for auditing purposes, or to generate reports summarizing key security events and system performance metrics.

In some embodiments, the audit and logging module 128 may be integrated with external compliance or governance systems to ensure that all logged events adhere to applicable data protection laws, security standards, or industry regulations. The module may further support the generation of audit trails that demonstrate the system's adherence to internal or external security policies, allowing the system to be regularly audited for integrity and compliance.

Figure 3:
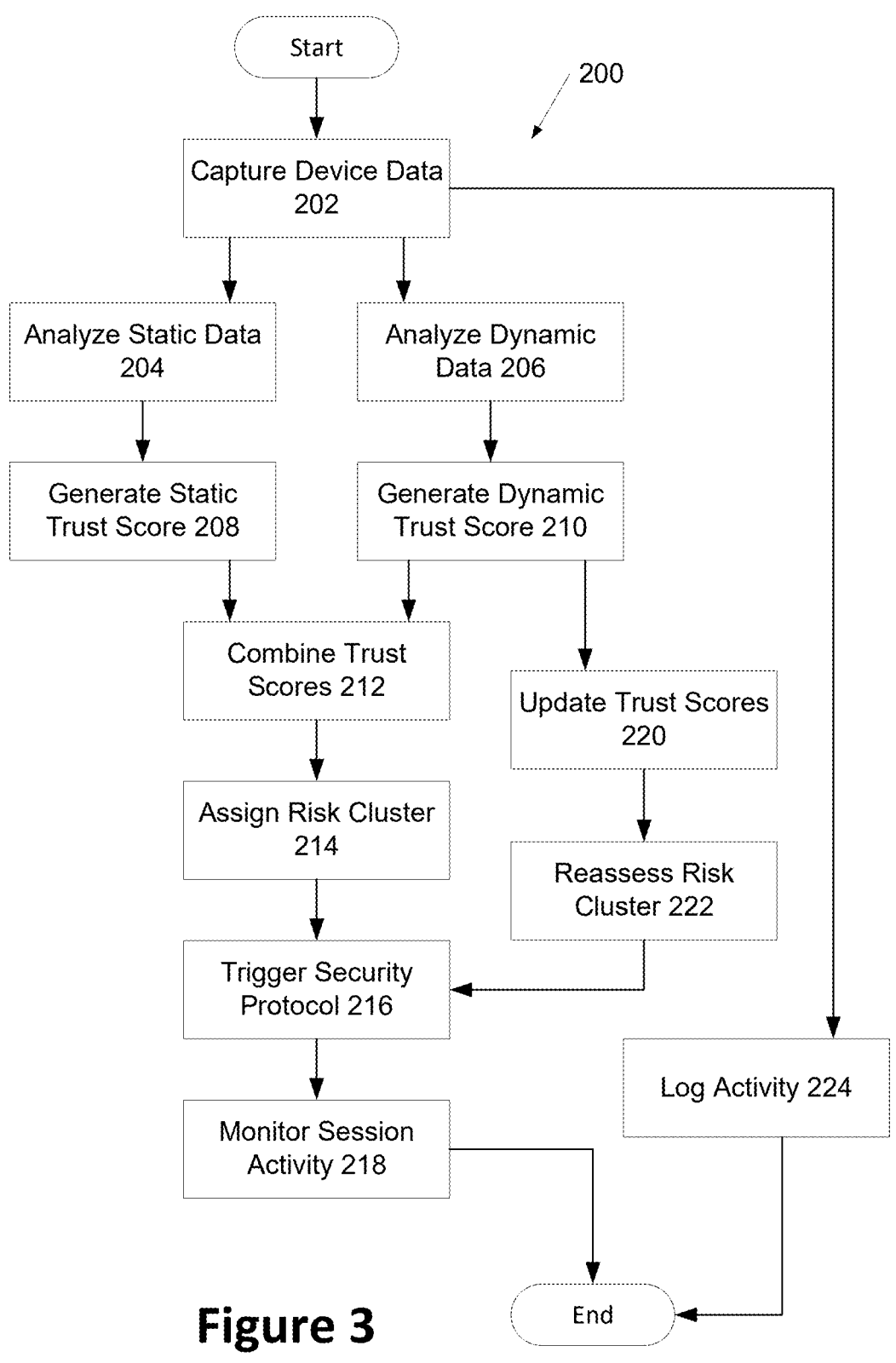
FIG. 3 shows an example method of managing device trust during digital interactions as performed by the system of FIG. 1.

Referring to FIG. 3, an example method 200 is shown for managing device trust during digital interactions. The method 200 comprises a sequence of steps for capturing device data, evaluating trust scores, assigning risk clusters, and triggering appropriate security protocols, and in some embodiments can be implemented by the computer system 100. For example, the server device 104 can be configured to interact with the client device 102 and the resource 108 through the network 106 to facilitate the execution of the steps outlined in method 200. The method may include steps such as capturing static and dynamic data from the client device 102, processing the data to generate combined trust scores, assigning the device to a risk cluster based on the trust scores, and invoking security measures tailored to the assessed risk level. The server device 104 may further use external data from resource 108 to augment the trust evaluation process, ensuring that security protocols adapt dynamically to the risk identified during the session.

The method can begin with step 202, wherein the system captures device data from the client device 102. This data includes both static parameters, such as device identifiers, hardware characteristics, and secure tags, and dynamic parameters, such as geo-location changes, IP address shifts, and session activity. The system may retrieve the static data from stored device profiles, while dynamic data is captured in real-time during the current session. This is followed by step 204, where the system analyzes the static data to generate a static trust score for the device. The analysis of static data may involve verifying the consistency of device identifiers, secure tokens, and hardware characteristics against previous sessions to establish a baseline trust level for the device.

In step 206, the system evaluates the dynamic data captured during the session to generate a dynamic trust score. The dynamic data, such as geo-location shifts, changes in IP addresses, and behavioral patterns during the session, are analyzed to detect any anomalies or deviations from expected behavior. The system may compare the current dynamic parameters with the historical dynamic data associated with the device to identify potential security risks. Step 208 then involves generating the static trust score based on the analysis of static parameters, such as whether the device identifier matches the expected value or if the hardware characteristics have remained consistent. In step 210, the system generates the dynamic trust score based on real-time evaluation of the dynamic parameters, adjusting the score according to any detected anomalies, such as unusual geo-location changes or unexpected session behavior.

Step 212 enables the system to combine the static and dynamic trust scores into a multidimensional combined trust score. This combined trust score may take into account both the inherent reliability of the static data and the real-time assessment of dynamic data, providing a holistic view of the device's trustworthiness. In step 214, the system assigns the device 102 to a risk cluster based on the combined trust score. The system can select from predefined clusters, such as a trusted cluster for devices with high trust scores, a moderate risk cluster for devices with some anomalies but not sufficient to raise major concerns, or a high-risk cluster for devices exhibiting suspicious or high-risk behavior.

These steps (202, 204, 206, 208, 210, 212, 214) can be performed in any order or simultaneously, allowing the system to continuously and comprehensively evaluate the data before proceeding to step 216. This ensures that the system has sufficient information from both static and dynamic assessments to assign an accurate risk classification and adapt security protocols accordingly.

In step 216, the method triggers an adaptive security protocol based on the risk cluster to which the device 102 has been assigned in step 214. The security protocol can be tailored to correspond to the trust level or risk classification of the device as determined by the combined trust score. For devices assigned to the trusted cluster, the security protocol may involve allowing the session to proceed with minimal or no additional security measures, thereby providing a seamless user experience.

In contrast, if the device is assigned to the moderate risk cluster, the security protocol may trigger step-up authentication, requiring the user to complete one or more additional verification steps. Such measures may include prompting the user to enter a one-time passcode sent to a registered device, requesting biometric authentication, or answering security questions. The objective is to ensure the legitimacy of the user while maintaining a balance between security and user convenience.

In cases where the device is placed in the high-risk cluster, the security protocol may implement more stringent measures, such as restricting access to sensitive account features or temporarily locking the user out of the account until further verification is completed. This may include requiring the user to contact customer support or undergo a manual identity verification process. In some embodiments, the system may also initiate monitoring of ongoing session activity, tracking for further suspicious behavior or anomalies.

In step 218, the method involves monitoring session activity in real-time. Once the device 102 has been assigned to a risk cluster and security protocols have been triggered, the system continues to observe ongoing activity during the session to detect any deviations from expected behavior. This may include tracking user interactions, such as navigation patterns, transaction history, and additional dynamic parameters like session length or further geo-location changes. The monitoring of session activity allows the system to identify any suspicious actions that may arise after the initial login or throughout the session.

In step 220, the method updates the trust scores for the device based on any new data or changes in the session activity observed during step 218. As the session progresses, the system may recalculate both the static trust score and the dynamic trust score using newly captured static or dynamic data. For example, if the system detects further anomalies in user behavior, such as multiple failed authentication attempts or new IP address changes, the dynamic trust score may be adjusted downward. Conversely, if the session proceeds without incident, the trust scores may be updated to reflect continued legitimate behavior, reinforcing the trust score positively. The trust scores are continuously refined to reflect the most accurate and up-to-date assessment of the device's trustworthiness.

In step 222, the system reassesses the risk cluster to which the device 102 has been assigned, based on the updated trust scores from step 220. The risk cluster assignment may be dynamically adjusted as new information is received during the session. For example, if the device was initially assigned to the moderate risk cluster but subsequent behavior aligns with trusted activity, the system may reassign the device to the trusted cluster. Conversely, if the system detects new or additional suspicious activity, the device may be reassigned to a higher-risk cluster, triggering additional security protocols as required. The continuous reassessment ensures that the security measures are responsive to ongoing changes in the session.

In step 224, the system logs all relevant events and actions in the audit and logging module 128. The system records details of the device's session, including the captured static and dynamic data, the initial and updated trust scores, the assigned risk clusters, any triggered security protocols, and ongoing session activity. This logging provides a detailed and comprehensive record of the system's decision-making processes and actions, allowing for future review, audit, or forensic analysis. The audit trail may also be used for compliance with security regulations and for tracking any security incidents that occur during the session. This logged data ensures that the system's operations are transparent and accountable.

Figure 4:
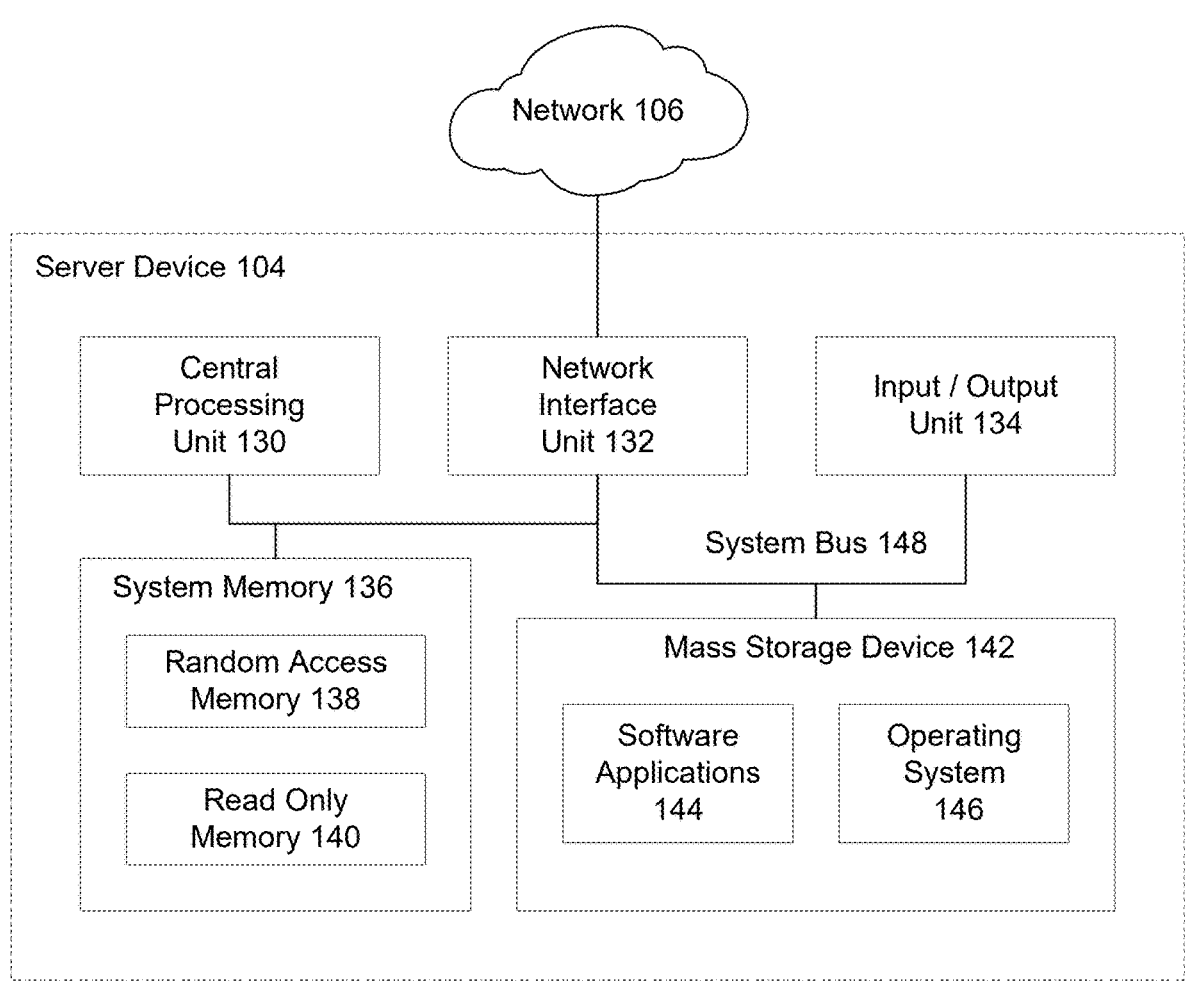
FIG. 4 shows example physical components of the server device of FIG. 2.

As illustrated in the embodiment of FIG. 4, the example server device 104, which provides at least some of the functionality described herein, can include at least one central processing unit ("CPU") 130, a system memory 136, and a system bus 148 that couples the system memory 136 to the CPU 130. The system memory 136 includes a random access memory ("RAM") 138 and a read-only memory ("ROM") 140. A basic input/output system containing the basic routines that help transfer information between elements within the computer system 100, such as during startup, is stored in the ROM 140. The computer system 100 further includes a mass storage device 142. The mass storage device 142 can store software instructions and data. A central processing unit, system memory, and mass storage device similar to that shown can also be included in the other computing devices disclosed herein.

The mass storage device 142 is connected to the CPU 130 through a mass storage controller (not shown) connected to the system bus 148. The mass storage device 142 and its associated computer-readable data storage media provide non-volatile, non-transitory storage for the computer system 100. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 104.

According to various embodiments of the invention, the computer system 100 may operate in a networked environment using logical connections to remote network devices through network 106, such as a wireless network, the Internet, or another type of network. The network 106 provides a wired and/or wireless connection. In some examples, the network 106 can be a local area network, a wide area network, the Internet, or a mixture thereof. Many different communication protocols can be used.

The server device 104 may connect to network 106 through a network interface unit 132 connected to the system bus 148. It should be appreciated that the network interface unit 132 may also be utilized to connect to other types of networks and remote computing systems. The server device 104 also includes an input/output controller 134 for receiving and processing input from a number of other devices, including a touch user interface display screen or another type of input device. Similarly, the input/output controller 134 may provide output to a touch user interface display screen or other output devices.

As mentioned briefly above, the mass storage device 142 and the RAM 138 of the server device 104 can store software instructions and data. The software instructions include an operating system 146 suitable for controlling the operation of the server device 104. The mass storage device 142 and/or the RAM 138 also store software instructions and applications 144, that when executed by the CPU 130, cause the server device 104 to provide the functionality of the computer system 100 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for managing device trust during digital interactions, comprising:
    one or more processors; and
    non-transitory computer-readable storage media encoding instructions which, when executed by the one or more processors, cause the computer system to:
        capture device data from a device upon user login to a digital platform, the device data including static parameter data and dynamic parameter data;
        analyze the static parameter data during an initial login session to establish a static trust score component for the device;
        analyze the dynamic parameter data in the initial login session and across future sessions to establish a dynamic trust score component for the device, wherein the dynamic trust score component is incrementally updated upon analyzing subsequent dynamic parameter data;
        combine the static trust score component and the dynamic trust score component to establish a combined trust score;
        assign the device to at least one of a first risk cluster, a second risk cluster, or a third risk cluster based on the combined trust score; and
        trigger an adaptive security protocol based on an assigned risk cluster,
            wherein an assignment to the second risk cluster initiates a moderate risk level authentication process, whereupon failure of the moderate risk level authentication process results in assigning the device to the third risk cluster; and
            wherein an assignment to the third risk cluster results in restricted access to the digital platform.

2. The computer system of claim 1, wherein the static parameter data comprises at least one of the following: device identifier, secure tag, hardware characteristics, operating system details, device manufacturer, and authentication credentials.

3. The computer system of claim 1, wherein the dynamic parameter data comprises at least one of the following: a geo-location, an Internet Protcol address, a session length, a login frequency, a transaction pattern, and a usage anomaly.

4. The computer system of claim 1, wherein the first risk cluster corresponds to a trusted status, the second risk cluster corresponds to a moderate risk status, and the third risk cluster corresponds to a high-risk status.

5. The computer system of claim 1, further comprising instructions which, when executed by the one or more processors, cause the computer system to update the combined trust score following each update to the dynamic trust score component.

6. The computer system of claim 1, further comprising instructions which, when executed by the one or more processors, cause the computer system to utilize an artificial intelligence model to predict future dynamic parameter data for the device based on historical device data.

7. The computer system of claim 1, wherein the moderate risk level authentication process comprises initiating a step-up authentication process, including at least one of requiring entry of a one-time passcode, requesting biometric authentication, or presenting a security question.

8. The computer system of claim 1, further comprising instructions which, when executed by the one or more processors, cause the computer system to mark the device for dynamic unlearning of a previous risk status.

9. The computer system of claim 1, wherein an assignment to the moderate risk level authentication process results in restricting specific actions on the digital platform until completion of the moderate risk level authentication process.

10. The computer system of claim 1, wherein assignment to the third risk cluster triggers a manual verification process, wherein a customer contact center or designated authority must approve an assignment of the device to at least one of the first risk cluster or the second risk cluster.

11. A method for managing device trust during digital interactions, comprising:

capturing device data from a device upon user login to a digital platform, the device data including static parameter data and dynamic parameter data;

analyzing static parameter data during an initial login session to establish a static trust score component for the device;

analyzing the dynamic parameter data in the initial login session and across future sessions to establish a dynamic trust score component for the device, wherein the dynamic trust score component is incrementally updated upon analyzing subsequent dynamic parameter data;

combining the static trust score component and the dynamic trust score component to establish combined trust score;

assigning the device to at least one of a first risk cluster, a second risk cluster, or a third risk cluster based on the combined trust score;

triggering an adaptive security protocol based on an assigned risk cluster, wherein an assignment to the second risk cluster initiates a moderate risk level authentication process, whereupon failure of the moderate risk level authentication process results in assigning the device to the third risk cluster; and wherein an assignment to the third risk cluster results in restricted access to the digital platform.

12. The method of claim 11, wherein the static parameter data comprises at least one of the following: device identifier, secure tag, hardware characteristics, operating system details, device manufacturer, and authentication credentials.

13. The method of claim 11, wherein the dynamic parameter data comprises at least one of the following: a geo-location, an Internet Protcol address, a session length, a login frequency, a transaction pattern, and a usage anomaly.

14. The method of claim 11, wherein the first risk cluster corresponds to a trusted status, the second risk cluster corresponds to a moderate risk status, and the third risk cluster corresponds to a high-risk status.

15. The method of claim 11, further comprising updating the combined trust score following each update to the dynamic trust score component.

16. The method of claim 11, further comprising utilizing an artificial intelligence model to predict future dynamic parameter data for the device based on historical device data.

17. The method of claim 11, wherein the moderate risk level authentication process comprises initiating a step-up authentication process, including at least one of requiring entry of a one-time passcode, requesting biometric authentication, or presenting a security question.

18. The method of claim 11, further comprising marking the device for dynamic unlearning of a previous risk status, wherein a trust profile of the device is dynamically updated and reset after successful authentication or risk mitigation actions.

19. The method of claim 11, wherein an assignment to the moderate risk level authentication process results in restricting specific actions on the digital platform until completion of the moderate risk level authentication process.

20. The method of claim 11, wherein assignment to the third risk cluster triggers a manual verification process, wherein a customer contact center or designated authority must approve an assignment of the device to at least one of the first risk cluster or the second risk cluster.

* * * * *